UNITED STATES PATENT OFFICE.

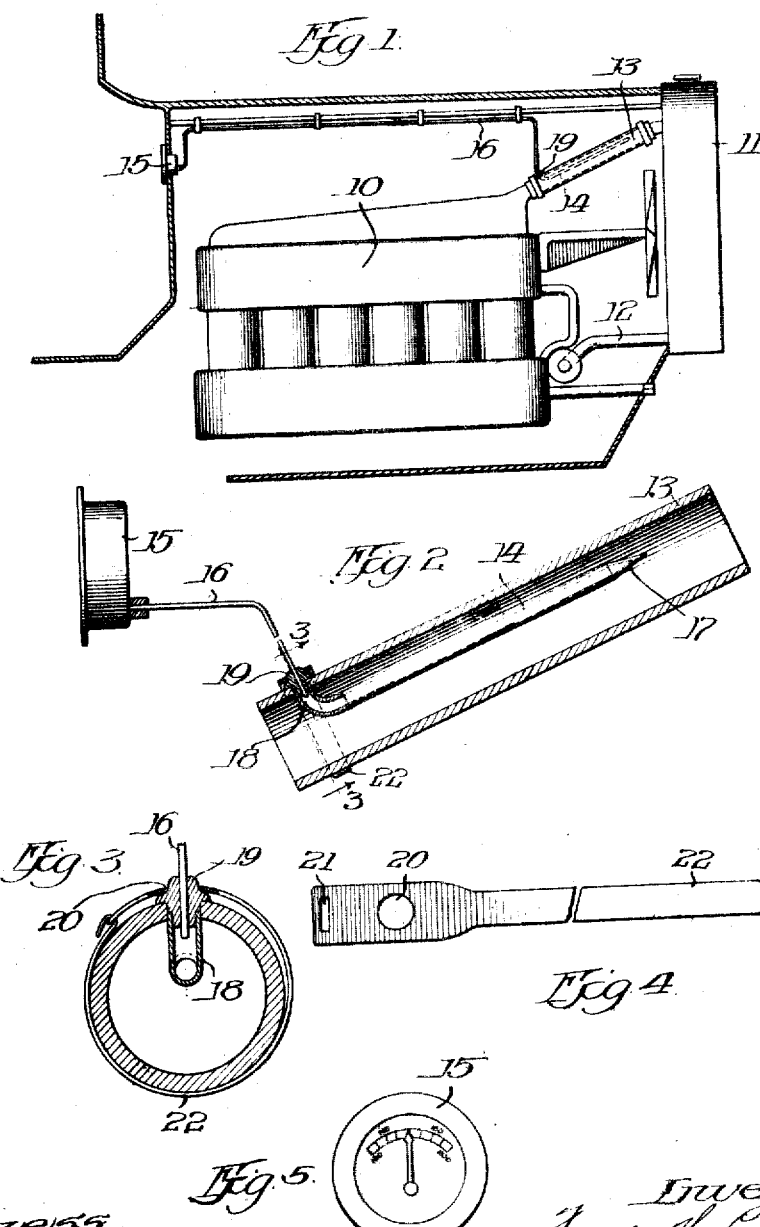

FRED W. POWERS, OF CHICAGO, ILLINOIS.

HEAT-INDICATING DEVICE.

1,274,326.

Specification of Letters Patent.

Patented July 30, 1918.

Application filed February 2, 1917. Serial No. 146,068.

*To all whom it may concern:*

Be it known that I, FRED W. POWERS, a citizen of the United States, and resident of Chicago, in the county of Cook and State of Illinois, have invented certain new and useful Improvements in Heat-Indicating Devices, of which the following is a specification.

My invention relates to heat indicators and has particular reference to a novel device of this character adapted to be associated with an automobile engine.

It has come to be well recognized that means should be provided for indicating visually to the operator the heat of an automobile engine. This desirability, in fact necessity, is so well known that I will not dwell thereon at length.

I have conceived the idea of providing a unitary heat indicating device so constructed as to permit of its being installed even by unskilled persons with the assurance that the operation will be exact and certain. To accomplish this result I provide a heat sensitive element in the form of a relatively long thin tube filled with a readily volatile liquid such as ether and adapted to be inserted without difficulty in the hose which connects the engine and radiator in all of the common forms of water-cooled automobiles. A pressure gage is provided for location on the dash, the gage and element being connected by a conduit having a relatively minute passage the parts being sealed at the factory. As a means for securing the tube in place I may provide any well known clamp or utilize cement or both.

In utilizing a device such as described, certain difficulties are encountered which have been overcome in my device. The size of the flexible conduit which connects the engine and radiator cannot be changed and therefore it must not be obstructed by the insertion therein of a bulky heat-sensitive element. To be effective, however, the element must be of such size as to be capable of containing an ample quantity of liquid. I secure the desired result by forming the heat sensitive element in the shape of a relatively long thin tube adapted to lie alongside of one wall of the tube. Thus the cross sectional area of the passage is not materially reduced. Furthermore, it will be understood that the device is intended primarily for installation by unskilled car owners, the device being located within the hose connection between the engine and radiator. To secure the desired result and to avoid forming a large aperture in the hose I bring the entrance end of the tube to a point and provide a short laterally bent portion having a shoulder or annular flange which will assist in sealing the opening necessarily formed. Thus a tube of the required capacity is adapted for location within the hose connection without materially reducing the area of the conduit and without requiring tool operations.

The invention will be more readily understood by reference to the accompanying drawings, wherein, Figure 1 is an elevation of an automobile engine and radiator to which my improvement has been applied;

Fig. 2 is an enlarged view partly in section, of the unit and the hose connection;

Fig. 3 is an enlarged cross sectional view on the line 3—3 of Fig. 2;

Fig. 4 is a plan view of a strap which I may employ for fastening the element in place, and, Fig. 5 is a face view of the pressure gage.

Referring more particularly to the drawings it will be seen that the engine 10, is connected to the radiator 11, by a bottom hose connection 12, and a top hose connection 13. By this means the water is permitted to circulate either by a pump or thermo-siphon action through the engine and radiator. The heat indicating unit comprises the heat sensitive element 14, the gage 15, and the connecting conduit 16. The heat sensitive element is in the form of a long tube, of small cross sectional area composed of copper or similar material, having a pointed end 17, and a right angular bend 18. The conduit 16 is connected to the tube by soldering, the same being entered through the enlarged end 19, which provides a shoulder or annular flange for engagement with the rubber hose. The heat sensitive element, the conduit and the gage are all permanently united at the factory for obvious reasons. In the construction shown an opening is made in the hose 13, and the element inserted, after which a strap 22 is caused to encircle the hose and clamp the element in place. The hole 20, in the strap fits over the end 19, the aperture 21, accommodating the smaller end of the strap for the purpose of fastening the same. The strap 22 constitutes a holder associated with the elbow of the hollow needle 14 for holding said needle in proper position within the hose 13. By reason of the pointed end and the short elbow or right angular bend, the tube may be inserted in a hose connection by making a very small opening in the hose. The short bend serves to retain the tube near the upper portion of the hose and in line therewith, thus obviating the possibility of the tube projecting across the opening and interfering with the circulation of water.

If desired the form of fastening means may be modified materially. For instance the nipple or union may be cemented or secured in other desired manners. Furthermore, other modifications may be made without departure from the spirit of my invention.

I am aware that a similar structure has been proposed in which the heat sensitive element is disposed in the upper conduit or water connection between the engine and radiator. This involves operations in installing which cannot be effected by the ordinary user and as my device is primarily intended for sale direct to the user, ease of application is an important factor in its success. My device may be readily installed by any unskilled user without the use of special tools.

I claim:

1. A heat indicating device for attachment to the hose connecting an automobile engine radiator with the water jacket of the engine, including a gage, a conduit connected thereto, a hollow needle containing an expansible fluid and in connection with the conduit, one end of the needle having a penetrating point and the opposite end having an elbow to which the conduit is connected, and a holder associated with the elbow for holding said needle to the hose in proper position.

2. The combination with a water jacket, a radiator, and a conduit connecting the radiator and water jacket, of a temperature indicating gage, a tube located within and disposed longitudinally of the conduit, one end of the tube having a penetrating point and the other end having an elbow projecting through the conduit, a tubular connection between the pointed tube and the gage, and a holder embracing the conduit and associated with the elbowed end of the pointed tube, there being an expansible fluid in the tube.

3. A temperature indicating device for attachment to the hose connecting an automobile engine radiator with the water jacket of the engine, comprising a temperature indicating gage, a tubular needle having an expansible fluid therein and provided at one end with a penetrating point and at its opposite end with an elbow, a conduit communicating between the elbow and the gage, and a holder strap attached to the elbow of the needle to attach said needle to the said first named conduit.

Signed at Chicago, Illinois, this 31st day of January, 1917.

FRED W. POWERS.

Witnesses:
W. A. EMINGER,
M. S. JACKSON.